United States Patent [19]
Dworkin et al.

[11] Patent Number: 6,026,148
[45] Date of Patent: Feb. 15, 2000

[54] SYSTEM AND METHOD FOR DELIVERING EXPERT INFORMATION BY COMPUTER

[75] Inventors: Ross E. Dworkin, Morton; Charles A. Bono, Norristown, both of Pa.

[73] Assignee: Blue Grotto Technologies, Inc., Norristown, Pa.

[21] Appl. No.: 08/863,892

[22] Filed: May 28, 1997

[51] Int. Cl.⁷ .............................. H04M 1/64; H04M 3/00; H04M 11/00
[52] U.S. Cl. .................................... 379/88.18; 379/88.13; 379/265; 379/308; 379/92.01
[58] Field of Search .............................. 379/67.1, 71, 76, 379/80, 88.01, 88.04, 88.13, 88.16, 88.18, 265, 88.14, 203, 223, 260, 308, 92.01, 92.03, 92.04, 93.12, 93.13; 705/4, 26

[56] References Cited

U.S. PATENT DOCUMENTS

| | | | |
|---|---|---|---|
| 4,757,525 | 7/1988 | Matthews et al. | 379/89 |
| 5,495,522 | 2/1996 | Allen et al. | 379/202 |
| 5,704,044 | 12/1997 | Tarter et al. | 395/204 |
| 5,754,939 | 5/1998 | Herz et al. | 455/4.2 |
| 5,812,639 | 9/1998 | Bartholomew et al. | 379/89 |
| 5,862,223 | 1/1999 | Walker et al. | 380/25 |

*Primary Examiner*—Fan S. Tsang
*Assistant Examiner*—A. Hoosain
*Attorney, Agent, or Firm*—William H. Eilberg

[57] ABSTRACT

A computer-based system facilitates exchange of information between users and expert respondents. The users post questions on a topic to a computer bulletin board or forum, using a telephone and modem connection to a remote server. The respondents contact the server by telephone, and receive a list of questions that have been posted. The respondents then dictate answers orally, by telephone, and the answers are recorded and stored by the server as sound files. The stored answers can later be played back by users who connect to the server through their personal computers. The answers can also be transcribed into text files for viewing by the users. Thus, a user can both hear the recorded voice of the respondent and see the stored text of the respondent's answer. The system makes it easy for respondents to answer questions, or provide comments, especially in cases where a respondent is not familiar with computer technology, or where a respondent is not conveniently located near a computer.

13 Claims, 10 Drawing Sheets

MEDICAL EXPERT'S GROUP FORUM

WELCOME TO THE MEDICAL EXPERTS GROUP FORUM. ACCESS TO THIS AREA IS BY MEMBERSHIP ONLY FOR THE PROFESSIONAL MEDICAL COMMUNITY.

THE FORUM IS DESIGNED TO PROVIDE YOU WITH EDUCATIONAL INFORMATION IN AN INTERACTIVE ENVIRONMENT. YOU WILL BE ABLE TO SUBMIT QUESTIONS FOR ANSWER BY THE VISITING PROFESSOR. IN ADDITION, FORUM MEMBERS MAY ANSWER POSTED QUESTIONS.

PLEASE NOTE, YOUR NAME, TITLE, SPECIALTY AND INSTITUTION WILL BE DISPLAYED AUTOMATICALLY WITH ALL POSTINGS YOU SUBMIT.

| REGISTER FOR SITE | ENTER SITE | LOGOFF |

FIG.3

QUESTION SELECTION

TO NARROW THE QUESTIONS SELECTED:
SELECT THE SEARCH OPTIONS BELOW, CLICK THE APPROPRIATE FILTER BUTTON AND FILL OUT THE SCREEN TO THE RIGHT.

[NO FILTERS ▼] [FILTER 1]

AND ○ OR ⦿

[NO FILTERS ▼] [FILTER 2]

[RETRIEVE SELECTED QUESTIONS] [POST A NEW QUESTION] [FORUM HOMEPAGE]

MEDICAL EXPERTS SCHEDULE

| | |
|---|---|
| ROSS DWORKIN | APRIL 9-15, 1997 |
| CHARLES BONO | APRIL 16-22, 1997 |
| MIKE HARRY | APRIL 23-30, 1997 |
| JOE SMITH | MAY 3-7, 1997 |
| JULIE BLANCHARD | MAY 9-15, 1997 |

QUESTION SELECTION INSTRUCTIONS

YOU CAN LIMIT THE SELECTION OF DISPLAY QUESTIONS BY SETTING THE FILTERING OPTIONS.

1) USE THE DROP DOWN LIST TO SELECT THE FILTER CRITERIA
2) CLICK THE APPROPRIATE FILTER BUTTON.
3) FILL OUT THE FIELDS THAT APPEAR IN THIS WINDOW.

FIG.5

QUESTIONS POSTED

●--MEDICAL EXPERT RESPONSE PROVIDED.

QUESTION #6 ● SUBJECT: THERAPEUTIC USE
1 REPLIES ON THU APR 10 1997 SUBMITTED BY: DR. MIKE HARRY [ONCOLOGIST] AT CROZER CHESTER M.C. DATE: SAT FEB 01 13:28:43 1997
IS ASPIRIN SAFE TO USE WITH SMALL CHILDREN, AND IS IT EFFICACIOUS?

QUESTION #5 ● SUBJECT: DIAGNOSTIC USE
1 REPLIES ON THU APR 10 1997 SUBMITTED BY: DR. JOHN SMITH [SURGEON [] U OF PENN DATE: SAT FEB 01 13:27:12 1997
HAS ASPIRIN BEEN USED IN A PREGNANT PATIENT AND WILL IT CROSS THE PLACENTA TO AFFECT THE CHILD?

QUESTION #4 ● SUBJECT: ADVERSE EFFECTS
1 REPLIES ON THU APR 10 1997 SUBMITTED BY: ROSS DWORKIN [NEURO SURGEON] AT HOWARD U. HOSPITAL DATE: SAT FEB 01 13:26:08 1997
IS THERE POTENTIAL FOR ANY DISEASE WITH THE USE OF ASPRIN?

QUESTION #3 ● SUBJECT: DRUG EFFECTS
2 REPLIES ON THU APR 10 1997 SUBMITTED BY FREQUENTLY ASKED QUESTIONS [] AT FORUM FAQS DATE SAT FEB 01

| POST QUESTION | SEARCH QUESTION BY... | FORUM HOME PAGE | UPDATE QUESTION |

FIG.6

QUESTION #1 SUBJECT: ADVERSE EFFECTS
SUBMITTED BY: JOE ROSS M.D. [THORACIC SURGEON] POST DATE: 2/3/97
ON THE WORKING SITE THE SELECTED QUESTION IS DISPLAYED HERE!.

COLLEAGUE
DISCUSSIONS

MEDICAL EXPERT,
MULTI-MEDIA
RESPOSE,
TRANSCRIPT

ANSWER #1  4/5/97
ROSS DWORKIN M.D.
[THORACIC SURGEON]
AT: CROZER CHESTER
MEDICAL CENTER

MEDICAL EXPERT

PHOTO GOES
HERE

NAME GOES HERE

[ POST ANSWER ]  [ GO BACK TO QUESTIONS ]  [ FORUM HOME PAGE ]  [ UPDATE ANSWER ]

FIG.7

QUESTION #2 SUBJECT CHEMISTRY
SUBMITTED BY: FREQUENTLY ASKED QUESTIONS [ ] POST DATE: 2/1/97
WHAT IS THE CHEMISTRY OF THE APROTININ MOLECULE?

COLLEAGUE DISCUSSIONS
MEDICAL EXPERT, MULTI-MEDIA
RESPONSE, TRANSCRIPT, ETRANSCRIPT

TRANSCRIPTION POSTING FORM

RESPONSE TO QUESTION 2
USER_ID: 102

APROTININ IS A ---------------------
------------------------------
------------------------------
------------------------------ SITE
OF THE TARGET ENZYME.

REPLY_TXT

SLIDE_STR  1.GIF

SUBMIT    CANCEL

FIG.9

SYSTEM AND METHOD FOR DELIVERING EXPERT INFORMATION BY COMPUTER

BACKGROUND OF THE INVENTION

The present invention includes a system and method for delivery of expert information through an on-line computer system.

Computer-based bulletin boards and forums have been known in the prior art. In a typical bulletin board system, various users access a central computer through remote connections, usually by connecting personal computers to the central computer, by telephone and modem. The users can then transmit messages to the central computer, the messages being stored in a memory area which other users can access. Thus, each user can "post" messages to the bulletin board, and can "read" messages posted by other users.

A computer forum is similar to a bulletin board system, except that there is an individual who conducts the forum. That individual may be located at or near the central computer, or at some remote location, in which case the connection to the central computer is also by telephone and modem. The various users can send messages to the person conducting the forum, these messages being stored in the memory of the central computer, and being available for other users to read. The person conducting the forum answers the messages, by posting answers to the memory of the central computer, and the answers become available to all users, including the originator of the message. The person conducting the forum may be a celebrity or expert, or anyone else whose answers to questions may be of interest to a large number of persons.

The computer forum of the type described above, in addition to its use in areas of general interest, has also been used for the dissemination of expert information. In one example, a pharmaceutical company or other organization may wish to provide expert information to physicians who are prescribing various drugs made by the company. A computer-based expert forum works in a manner which is generally similar to that described above, but which is also different in some ways. One difference is that there may be several or many experts who receive the messages posted to the bulletin board. Another difference is that the experts do not necessarily answer the questions immediately, but instead post their answers to the bulletin board hours or days after a question is asked.

The above-described arrangements work well, but they have a disadvantage that can be significant. The disadvantage is that, when one relies on a number of technical experts, these experts must all have some facility with computers, and must be located near a computer, in order to provide answers to posted questions. Although persons of all ages and backgrounds now use computers, there are still many persons who are uncomfortable with computers, and who are reluctant or unable to type information into a computer using a keyboard. Moreover, even the most computer-literate person may not be conveniently located near a computer all of the time. Although powerful portable computers have become quite common, not every expert is guaranteed to have easy access to one, at every moment.

The present invention solves the above-described problems by providing a system and method for dissemination of information, especially expert information, wherein the experts providing the information need not be computer-literate, and need not be located near a computer.

SUMMARY OF THE INVENTION

In the method of the present invention, a user submits a question, to a server or central computer, in essentially the same way that a message is posted to a conventional computer bulletin board. The user typically gains access to the central computer by using a personal computer connected to a modem which is connected to a telephone line. Alternatively, the user can gain access to the system through a network connection. The user's question is stored in the memory of the central computer. An expert respondent is then selected, either manually by the user or automatically by the system, and the respondent is presented with the question. The system may be programmed to alert the respondent that a question has been posted, such as by activating a conventional paging device. The respondent answers the question by telephone, by calling a predetermined number, and dictating an oral response. The response is received by appropriate voice-recording circuitry, and is converted into a machine-readable sound file, which sound file is then stored in the memory of the central computer. The user can later gain access to the central computer, and can download the sound file, and listen to the respondent's answer. The user could also play the sound file as it is being downloaded.

In the method described above, the respondent does not use a computer in formulating or transmitting a response. The respondent need not use anything more than a telephone, into which he or she dictates the response.

In another embodiment, the respondent's answer is transcribed into a text file, and the text file is stored in the memory of the central computer. The user then has a choice of either or both of listening to the actual recorded voice of the respondent, and reading the transcribed text. The transcription can be done automatically or by a human operator. The human operator need not be physically located at the central computer, but can use a telephone link to retrieve sound files and to transmit the transcribed versions back to the central computer.

The invention also includes an apparatus for performing the method described above.

The present invention therefore has the primary object of providing a method of delivering information by computer.

The invention has the further object of disseminating expert responses to technical questions, using an on-line system.

The invention has the further object of making it easy for expert respondents to provide answers to questions, even where such respondents are not computer literate, or where the respondents are not conveniently located near a computer.

The invention has the further object of providing expert responses to technical questions, in a voice-based format.

The reader skilled in the art will recognize other objects and advantages of the present invention, from a reading of the following brief description of the drawings, the detailed description of the invention, and the appended claims.

BRIEF DESCRIPTION OF THE DRAWINGS

FIGS. 3–9 provide representations of hypothetical screen displays that are seen by a user of the system of the present invention.

DETAILED DESCRIPTION OF THE INVENTION

The present invention comprises an on-line system, similar to a computerized bulletin board or forum, in which users post technical questions, and in which those questions may be answered by one or more expert respondents, and/or by other users. The users normally gain access to the system by connecting their personal computers, through modems and telephone lines, to a central computer which stores the information comprising the forum. Users could also be connected to the forum through other types of network connections which may or may not include telephone lines. The expert respondents preferably gain access to the forum by telephone. The oral responses of the experts are stored in sound files, in the memory of the central computer, and may also be transcribed into text files, so that the users can see and/or hear the responses of the experts. The expert respondents could also type their answers on a keyboard and transmit the answers by computer.

Figure 1:
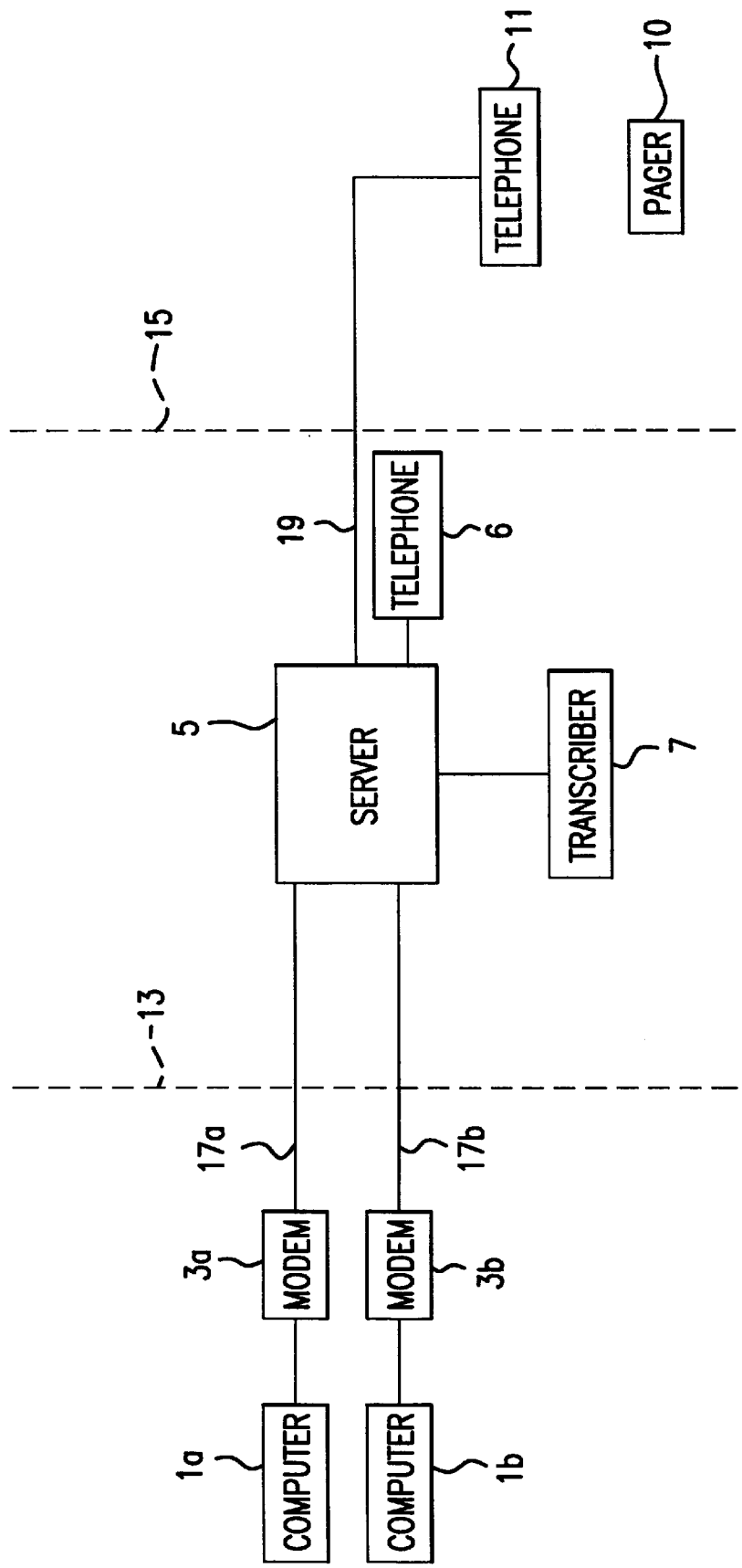
FIG. 1 provides a block diagram of the major components of the apparatus of the present invention.

FIG. 1 provides a block diagram showing the basic components of the system of the present invention. The region to the left of dotted line 13 represents the locations of the users, and the region to the right of dotted line 15 represents the location of an expert respondent. The users operate computers 1a, 1b, which may be personal computers, connected to modems 3a, 3b, which are connected to telephone lines 17a, 17b. The telephone lines link the computers and modems to server 5, the server being a central computer which houses a bulletin board system or forum according to the present invention. The expert respondent operates telephone 11 which is connected to server 5.

In the preferred embodiment, the server is also connected to telephone 6 which is used to alert a respondent concerning the presence of a question. The system can be programmed to select the respondent, and to dial the respondent's pager number, stored in the system memory. This step activates the respondent's pager 10, telling the respondent automatically that a question has been directed to him or her.

In the most general case, there can be large numbers of users and large numbers of expert respondents, connected in parallel to the server. The users and respondents can be located virtually anywhere, as long as they can be connected to the central computer by a telephone line or equivalent. For the sake of simplicity, FIG. 1 shows only two computers representing the users, and one telephone associated with an expert respondent.

Transcriber 7 is connected to server 5. The transcriber may be an automatic device which converts the oral responses of the expert respondents into a conventional text. Alternatively, the function of the transcriber 7 may be performed by a human operator, located either near the server, or connected to the server by a modem and telephone line.

Figure 2:
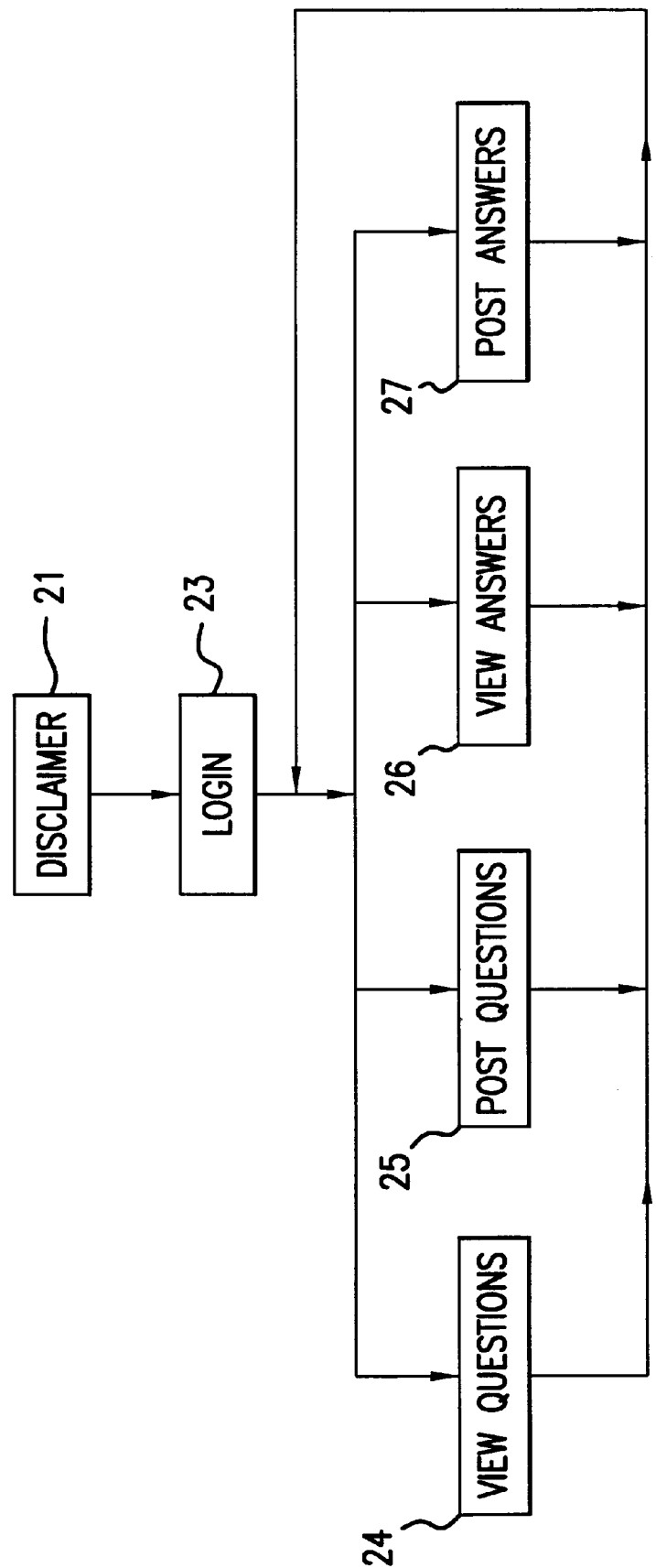
FIG. 2 provides a flow chart illustrating the major steps performed by the user of the method of the present invention.

FIG. 2 provides a flow chart showing the most general features of the method of the present invention, as practiced by the user.

Block 21 represents a disclaimer which may be provided by the operator of the system. Since the system of the present invention comprises an intermediary between users and expert respondents, and provides a computer environment in which expert information can be exchanged, the operator of the system may wish to disclaim liability for the content of the information being exchanged or provided. Thus, block 21 represents an initial disclaimer screen which is displayed to the user before the user is permitted to enter the system. The system is preferably programmed to require the user to indicate consent to the disclaimer before continuing. If the user indicates consent (by pressing an appropriate key on a keyboard or by clicking on the appropriate icon, with a mouse), the system continues. If the user does not consent, the system goes no further, or returns to a "home" page. The disclaimer is optional, however, and the invention can be practiced without it.

FIGS. 3 through 9 show hypothetical screen displays as seen by the user of the present invention. The format and content of each screen is intended as an example, and should not be deemed to limit the invention. The invention is not limited by any particular style or design of screen display. Note also that FIGS. 3–9 do not include the initial screen display containing the disclaimer of the operator of the system, as described above.

FIG. 3 provides a sample "front page" of the system of the present invention, as seen by the user. In the example given, the system is called the "Medical Expert's Group Forum", as the expert information in this example relates to the medical field. The present invention is not limited by the field in which the users and expert respondents are engaged, nor is it limited by the titles given in the example shown.

As indicated in the text shown in FIG. 3, the user can submit questions to an expert respondent, and can also answer questions that have been posted to a computer bulletin board or forum by other users. In the preferred embodiment, each user must register, and must provide educational or professional background information. In the preferred embodiment, some or all of the background information is displayed with all questions or postings submitted by the user.

Figure 4:
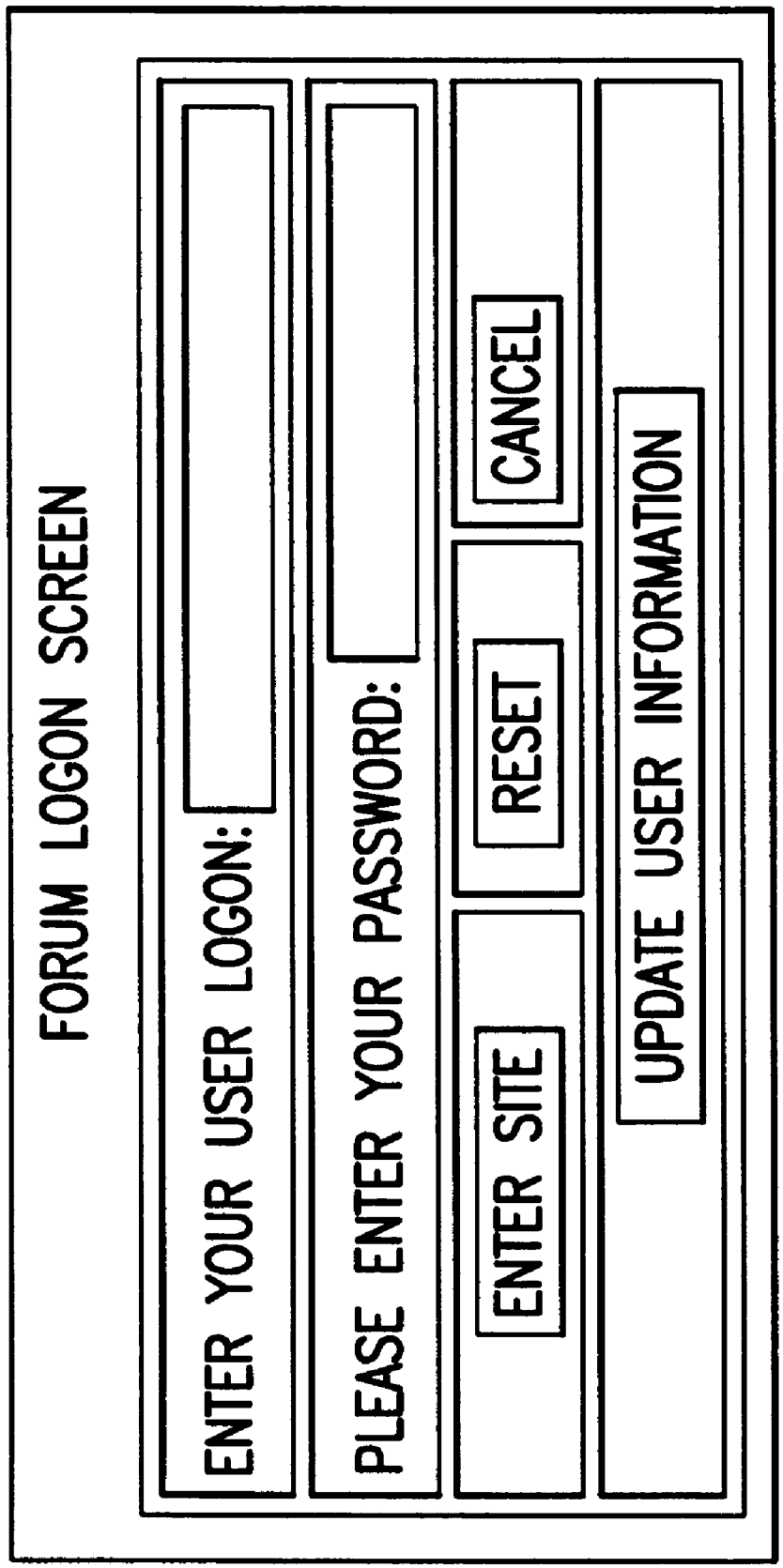

FIG. 4 shows a screen which enables a user to log into the system. In the preferred embodiment, the user is required to enter a user number or name and a password. The system verifies that the user is indeed an authorized member of the forum, and creates a "token" that is stored both at the server and at the user's computer. The information contained in the token is then verified on each page seen by the user, to enhance the security of the system. In an alternative embodiment, the system may internally generate a random number that may be stored with the token, which number is not known by the user, thus further enhancing the security of the system.

It is, of course, possible to operate the system and method of the present invention without having any user numbers or passwords.

FIG. 5 shows a screen which allows the user to create "filters" for questions. The "filters" comprise criteria by which the user wishes to limit questions displayed on the next screen. Such criteria could include dates (i.e. display only questions posted after a certain date), subjects, authors, etc. The user can click on either of two filter icons, and can create a filter by typing a filter criterion in the filter box. In the example shown, there can be up to two filter criteria, logically linked by "and" or "or", as determined by the user. For example, the user may wish to view only questions dealing with neurology which have been posted after a certain date. The user inserts the word "neurology" into one of the filter boxes, and inserts an appropriate date qualifier into the other filter box. By clicking on the "and" link, the user can require that both of these criteria must be satisfied.

As shown in the screen illustrated in FIG. 5, the user may then retrieve questions, or may post a new question to the bulletin board or forum. The user is also given the option of returning to the home page of the system. The screen shown in FIG. 5 also provides a list of expert respondents, and the times during which each respondent will be available.

The present invention can also be practiced with other numbers of filter criteria, or with no filters at all. In the example given, only one expert respondent is available at one time. In the most general case, there can be any number of respondents who may access the system and answer questions.

FIG. 6 illustrates a screen display that is obtained when the user selects "Retrieve Selected Questions" from the previous screen. The screen shows a filtered question list, i.e. a list of questions which satisfy the criteria specified by the user. The system places a colored dot next to a question to indicate that that question has been answered by an expert respondent, and that the user may therefore retrieve the answer to that question. The screen also allows the user to search through the retrieved questions according to further criteria to be specified by the user. The user may also post a new question by clicking the indicated box. The user may also update existing questions, but in the preferred embodiment, the system is programmed to prevent the user from altering questions that did not originate with that user.

The user views an answer to a question by clicking on the question. FIG. 7 illustrates a sample screen that appears when the user clicks on a question. The screen repeats the question, and shows the name and background of the person who submitted it. The question may appear in a rephrased form; the rephrasing can be done by an operator of the system. The screen shows a picture and biography of the expert respondent who has provided an answer to the question. At the bottom of the screen, the icon labeled "Post Answer" enables the user to post an answer or opinion on the subject. If the user who posts an answer is not one of the expert respondents, then the existence of the answer is indicated on the left-hand side of the screen, together with an answer number. The example shown in FIG. 7 shows an answer that was posted by a user who was not one of the expert respondents. Other users can click on this answer to view it. By clicking on the appropriate icon, the user may also update answers that originated with that user. The other icons enable the user to return to the questions or to the home page.

Figure 8:
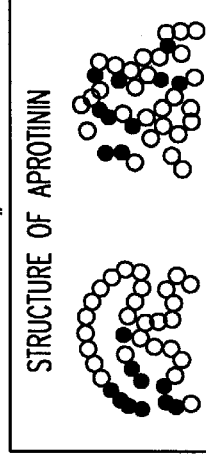

FIG. 8 shows a screen that contains the answer to the question, as provided by the expert respondent. The user reaches this screen by clicking on "Multi Media Response", shown at the left in FIG. 7. As shown in FIG. 8, the answer may include text and/or graphics, as shown in the figure. By clicking on the "Real Audio" icon, the user can hear the answer as spoken by the expert respondent. The user may also download the spoken answer by clicking on the indicated icon. The user may also play the sound file as it is being downloaded.

FIG. 9 shows a screen which contains a transcript of the answer provided by an expert respondent. This screen is reached by clicking on "Transcript", on the left-hand side of FIG. 7. The transcribed text may be generated by a system operator who listens to the audio answer provided by the expert respondent, and prepares and stores a textual version on the system. The text could also be produced by automated means.

Figure 10:
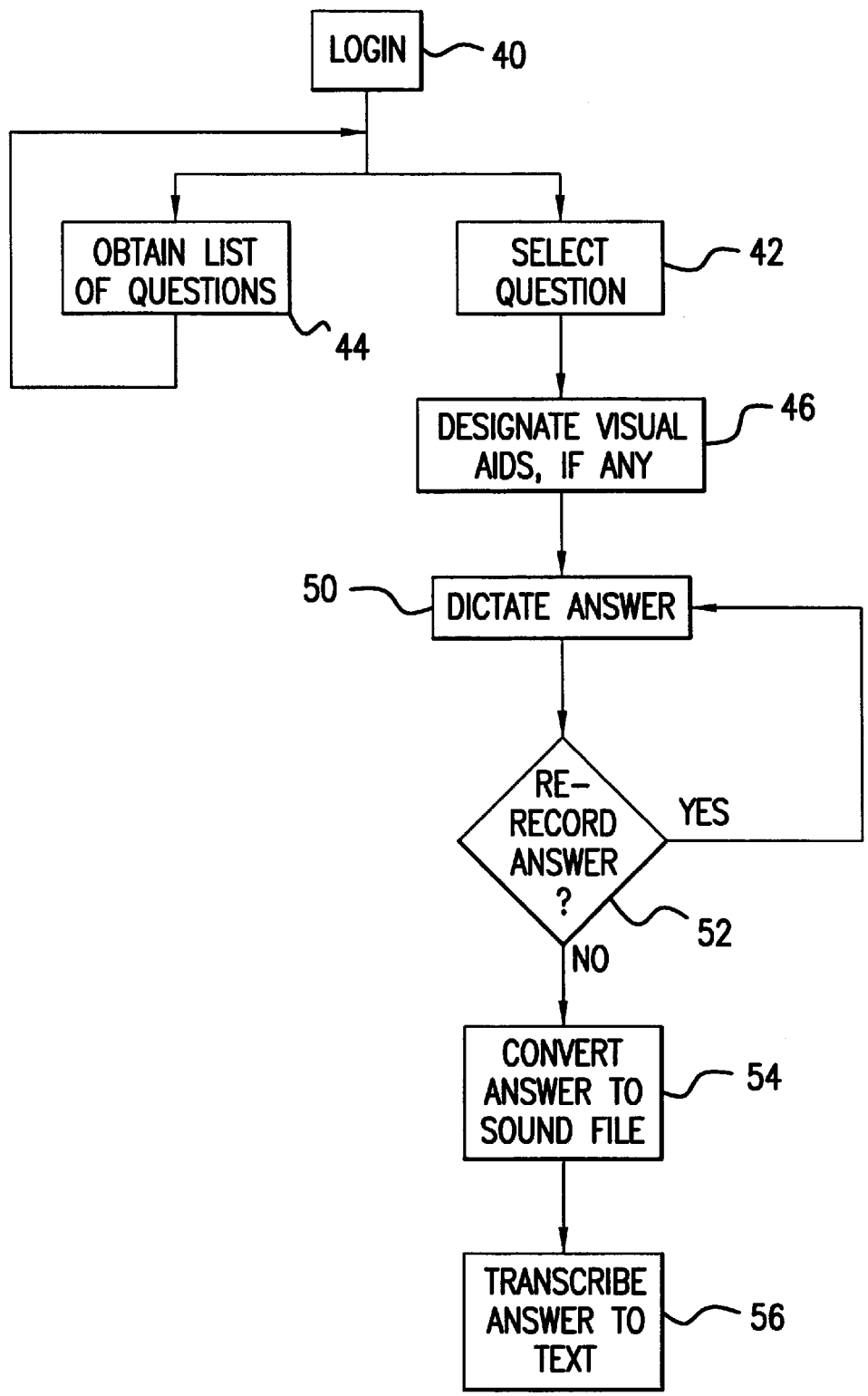
FIG. 10 provides a flow chart showing the steps performed by an expert respondent in the method of the present invention.

FIG. 10 provides a flow chart illustrating the steps performed by the system, from the viewpoint of an expert respondent who telephones the central computer, according to the present invention.

Block 40 represents a login sequence. This block may be implemented by providing a series of recordings which contain voice prompts, to which the respondent replies by entering a number or numbers on the telephone key pad. For example, when the respondent first calls the central computer, a recording prompts the respondent to enter a user number and then a password. The system receives the data entered by the respondent, and checks to determine that the data are valid. If not, the system will not allow access to further information. If the data entered are valid, the system proceeds with the next selection. The preferred embodiment includes the latter security controls, but the invention can also be practiced without them.

In block 42, the system prompts the respondent to select a question to be answered. As before, the prompt comprises a recorded voice which asks the respondent to enter a question number followed by the pound sign. The recording can also advise the respondent that pressing zero and the pound sign will enable the respondent to receive a list of unanswered questions by fax. Block 44 represents this option of receiving a list of questions. If the user chooses this option, another recording asks the respondent to enter a fax number on the key pad. The system then retrieves the questions that have not been answered, creates a text file showing these questions, and transmits the file, by fax, to the telephone number entered by the respondent.

If the respondent enters a non-zero number, in block 42, indicating that the respondent wishes to answer a particular numbered question, the system proceeds to block 46. Here, the system asks the respondent whether any visual aids (such as slides) will accompany the answer. The system prompts the respondent with a voice recording, and asks the respondent to enter the number of visual aids or slides, as indicated in block 48. Alternatively, the system can simply ask the respondent to enter a number of visual aids, with the understanding that a response of zero indicates that no such visual aids will accompany the answer. Since the connection between the expert respondent and the central computer is by telephone only, the visual aids must normally be provided to the central computer in advance, based on the respondent's expectation of the subject matter of the questions to be answered.

In block 50, the system prompts the respondent to provide the answer to the question. The respondent then orally states the answer into the telephone receiver. The oral answer is therefore transmitted directly to the server by telephone. The server is equipped with a commercially available circuit board which contains circuitry which receives and digitizes an incoming audio signal. The digitized audio signal is then stored in the computer, such as on a hard disk or other storage medium. When the respondent has finished, he or she presses a key (such as the pound key), as directed by the recording, to indicate that the answer is complete.

The system then asks the respondent, through another voice recording, whether the respondent is satisfied with the answer just dictated, or whether the respondent wishes to re-record. The system can also give the respondent a chance to listen to the recording just made. This operation is represented by test 52. The respondent may re-record the answer as many times as desired, as indicated by the loop-back to block 50. After one or more iterations, the respondent eventually will approve the recording. The system then saves the recording in the server memory.

In block 54, the system converts the recording made by the respondent into a sound file which is stored in the memory of the server. In block 56, the sound file is transcribed into a text file which is also stored in the server memory. The transcription could be performed automatically by the server, or it could be performed by a human operator who listens to the sound file and prepares a corresponding text. The human operator need not be at the same physical location as the server; the operator could telephone the server, listen to the respondent's recording by telephone, prepare a text, and transmit the text to the server, using a computer, a modem, and a telephone.

In the example given above, there was only one expert respondent at one time, each respondent being "on duty" for a predetermined period of time. As mentioned above, there could instead be more than one expert available at the same time. The user could be given the opportunity to direct a question to an expert of his or her choice. Alternatively, the system can be programmed to direct the question to a particular expert respondent. One way of choosing the expert is to analyze the key words appearing in a question, and comparing those key words with the key words appearing in a biography of the expert. The greater the number of matches between the two sets of words, the greater the likelihood that the expert is appropriate to respond to the question. In another alternative, the system could ask the user to indicate a subject, from a menu of possible subjects, and the system would then choose an expert according to the subject selected. The invention is not limited by the manner of choosing an expert, however, and much simpler and more unintelligent means of making the choice could be used instead, within the scope of the invention. For example, a question could be assigned at random to any available expert respondent.

The system can be enhanced to allow general users, not just expert respondents, to gain access to the system by telephone. Using the key pad on the telephone, the user could obtain, by fax, a list of all or some of the questions posted on the system, and the answers to some or all of those questions. Such an enhancement would work in the following manner.

The user would first log into the system by entering a user number and password on the telephone key pad, in response to appropriate voice prompts. The system would then ask the user to indicate (by pressing an appropriate key) whether the user wishes to receive questions or answers to one or more questions. If the user wants to receive questions, the system would give the user the option of receiving all questions, or only questions posted since a certain date (to be entered by the user), or questions posted on a particular date, or questions relating to a certain subject, the subject being selected by the user after hearing a list recited by a recorded voice. The system could also be programmed to provide, to the user, a list of subjects. The system would then ask for and verify the user's fax number, and would fax the requested information to the user. The system could also store the user's fax number, and give the user the opportunity to change the stored information.

Similarly, if the user wishes to retrieve answers to questions, the system would ask the user to indicate the questions for which answers are desired, and, in response to the user's inputs, the system would then transmit the desired information by fax as before. The system could also be programmed to provide all answers having a particular date or a particular range of dates.

While the invention has been described with respect to certain preferred embodiments, the details of the invention can be varied in many ways, all within the scope of the invention. For example, the type of information submitted by the respondents can be varied. Most of the choices provided to the users and the expert respondents, shown in the above examples, could be varied or even eliminated. The specific content of the voice prompts used to communicate with the respondents by telephone can be changed. The connection between the users and the server could be through means other than a conventional modem and telephone line, such as through a dedicated network connection or other communications method, without departing from the scope of the invention. The invention need not be limited to an exchange of questions and answers. Other kinds of information can be submitted by users, to the server, to which expert respondents can comment in the manner described above. These and other modifications, which will be apparent to persons skilled in the art, should be considered within the spirit and scope of the following claims.

What is claimed is:

1. A method of providing information by computer to a plurality of users, from at least one expert respondent, the method comprising the steps of:

a) submitting a question, in machine-readable form, to a computer, the question being submitted by any one of a plurality of users, the computer having a memory capable of storing the question, and storing the question in said memory, wherein the question is made accessible to all of said users, b) transmitting the question to an expert respondent who will answer the question, c) receiving an oral response, from the expert respondent, through a telephone line connected to said computer, d) converting the oral response to a machine-readable sound file, and storing said file in said memory, and e) playing said sound file to any of said users upon receipt of an electronic request from any of said users.

2. The method of claim 1, wherein steps (a) through (d) are repeated a plurality of times for a plurality of different questions, and wherein the method comprises retaining all of said questions and answers in said memory, such that all of said plurality of users have access to all of said questions and responses thereto.

3. The method of claim 1, further comprising the steps of transcribing said sound file into a text file, and storing said text file in said memory, wherein said text file is accessible by any of said users.

4. The method of claim 1, wherein the computer is positioned at a location which is different from a location of the expert respondent, and different from locations of said plurality of users.

5. The method of claim 1, wherein step (b) comprises the steps of receiving a request, made by the respondent, for a fax transmission to a telephone number selected by the respondent, and transmitting a selected question, by fax, to said telephone number.

6. The method of claim 1, wherein step (c) also includes the step of designating at least one visual aid which will accompany the response made by the expert respondent, said visual aid being stored in the memory of the computer, and being made accessible to any of said plurality of users.

7. The method of claim 1, wherein step (b) includes the step of activating a pager to alert the expert respondent that a question has been submitted by one of said plurality of users.

8. A system for providing information by computer, comprising:

a) means for submitting a question, in computer-readable form, from any one of a plurality of users, to a server, the server including means for storing the question and for making the question accessible to all of said plurality of users, b) means for transmitting the question to an expert respondent who will answer the question, c) means for receiving an oral response, from the expert respondent, through a telephone line connected to the server, and d) means for converting the oral response to a machine-readable sound file, and for storing said file in said memory, and for making said sound file available for playback at a request of any of said plurality of users.

9. The system of claim 8, further comprising means for transcribing the oral response into a text file, and for storing the text file in said memory and for making said text file accessible to any of said plurality of users.

10. The system of claim 8, wherein the server comprises means for retaining all of said questions and responses, wherein the server comprises means for making said retained questions and responses available to any of said plurality of users.

11. The system of claim 8, wherein the server is positioned at a location which is different from a location of the expert respondent, and different from a location of at least one of said plurality of users.

12. The system of claim 11, wherein the submitting means includes a personal computer and modem controlled by one of said plurality of users.

13. The system of claim 8, wherein the transmitting means includes means for activating a pager to alert the respondent that a question has been submitted from one of said plurality of users.

* * * * *